United States Patent [19]

Dalman

[11] 3,979,077
[45] Sept. 7, 1976

[54] DISPENSING APPARATUS FOR CIRCULAR HAY BALES

[76] Inventor: Donald S. Dalman, P.O. Box 156, North Plains, Oreg. 97133

[22] Filed: June 13, 1975

[21] Appl. No.: 586,571

[52] U.S. Cl. .......................... 241/101.7; 214/83.14; 214/518; 241/283
[51] Int. Cl.² .......................................... B02C 18/02
[58] Field of Search ............. 241/101 A, 101.7, 283; 214/83.14, 518, 519; 144/209 R

[56] References Cited
UNITED STATES PATENTS

| | | | |
|---|---|---|---|
| 3,389,821 | 6/1968 | Weichel | 214/519 X |
| 3,741,051 | 6/1973 | Brooks et al. | 241/101.7 X |
| 3,804,279 | 4/1974 | Braunberger et al. | 214/83.14 X |
| 3,817,405 | 6/1974 | Neely | 214/519 |
| 3,830,438 | 8/1974 | Garrison et al. | 241/283 |

*Primary Examiner*—Granville Y. Custer, Jr.
*Assistant Examiner*—Howard N. Goldberg
*Attorney, Agent, or Firm*—James D. Givnan, Jr.

[57] ABSTRACT

An attachment for farm vehicles facilitating the transport and dispensing of hay from circular hay bales, the attachment including a frame supported by lift arms of the vehicle. A spindle, rotatably mounted on the frame, projects forwardly for insertion into a hay bale. A cutter assembly, supported by the frame, is adapted for positioning toward and away from the spindle mounted bale to separate material from a rotating bale which material is deposited upon a chute for discharge in a lateral direction. The chute and attachment frame are vertically positionable to permit material deposit into feed bunks.

7 Claims, 4 Drawing Figures

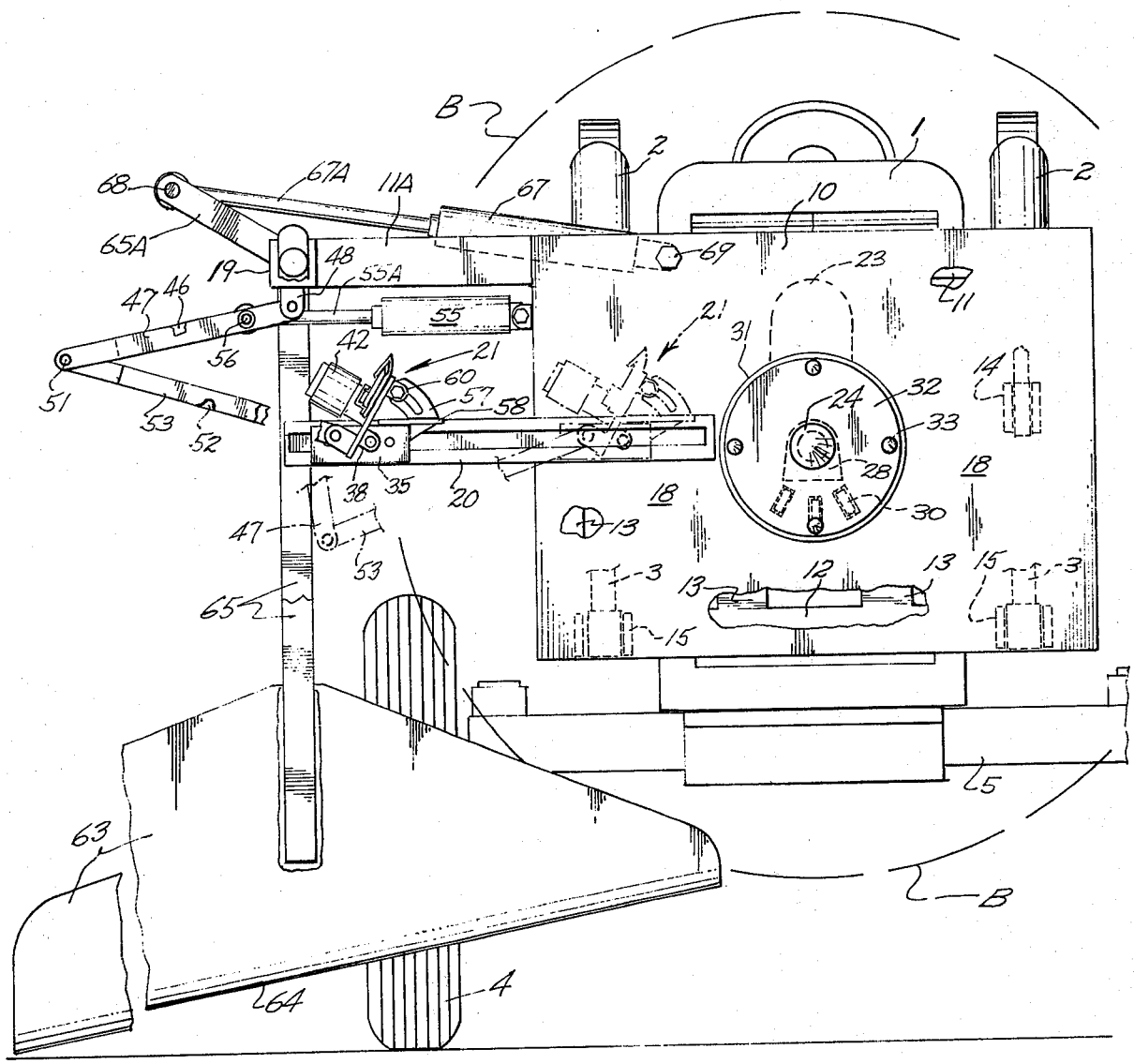
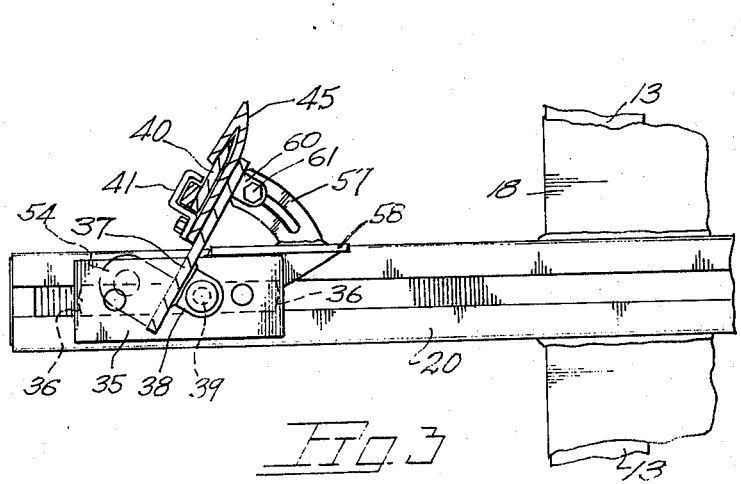
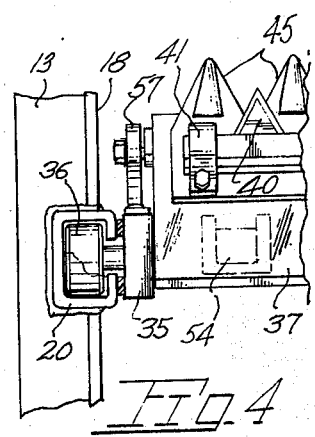

DISPENSING APPARATUS FOR CIRCULAR HAY BALES

BACKGROUND OF THE INVENTION

The present invention relates generally to farm equipment and more particularly to an attachment for farm vehicles enabling both the transport of a circular bale of hay, or other fodder, and the dispensing of the baled material.

In common use are baling machines which form hay into large, circular bales which are of a highly compacted nature and range from approximately 1,500 pounds to 3,000 pounds. While certain advantages exist in baling hay in such a manner, a problem has arisen in transporting of the heavy, cumbersome bales. A related problem is the dispensing of the highly compacted hay or other fodder. Costly attachments for existing farm vehicles include fork assemblies which enable lifting and transporting of the bales with no provision made for distributing the baled hay for cattle feeding purposes. The bales, left in a free standing manner for cattle feed, result in substantial waste as a significant portion of the hay is trampled or lost as feed by reason of being contaiminated. Further, the access of cattle to the intact bale is restricted.

While some efforts have been made to provide an efficient system for discharging baled hay such have not been entirely successful by reason of their complicated, costly nature. Such systems include heavy components which, along with the hay bale, are offset from the supporting vehicle centerline to render the vehicle susceptible to tipping.

SUMMARY OF THE INVENTION

The present invention is embodied within a farm vehicle attachment adapted for lifting engagement with a hay bale for transport thereof with cutter means of the attachment enabling the dispensing of hay along a linear course for optimum cattle access.

The present attachment comprises a frame for detachable engagement with the lifting arms of a front end loader or like vehicle. A frame mounted spindle is adapted for inserted engagement with the circular hay bale with powered spindle rotation imparting rotary motion to the elevated bale. Additionally supported by the frame is a cutter assembly for gradual advancement toward the spindle rotated bale which, in effect, serves to both cut and dispense the fodder. For regulating such dispensing, operator controls are provided to control bale rotation as well as advancement of said cutter assembly toward the bale. A chute, carried by said frame, receives the separated hay guiding same onto the ground surface or, if desired, over the side of a feed bunk which normally is several feet in height. The chute, in addition to being vertically positionable, may be swung to an inoperable position during initial engagement of the attachment spindle with a bale.

Important objectives of the present invention include the provision of: a hay dispensing attachment for farm equipment enabling the dispensing of hay from a heavy, cumbersome bale of circular configuration so as to distribute the hay for optimum access by cattle with minimal waste; a hay dispensing attachment including a cutter assembly for advancement into the hay bale to progressively remove and cut the hay from the rotating bale at any desired rate; a hay dispensing attachment alternately usable simply as a hay bale transporting means dispensing with the need for a costly fork attachment; a hay dispensing attachment wherein the weight of the attachment is minimal and wherein the hay bale is supported along an extended centerline of the supporting vehicle to maintain vehicle stability; a hay dispensing attachment enabling precise control of the amount of hay dispensed and placement of the dispensed hay.

BRIEF DESCRIPTION OF THE DRAWINGS

In the accompanying drawings:

FIG. 1 is a front elevational view of the present attachment in place on the arms of a front end loader apparatus, FIG. 3 is an enlarged, sectional view of the inner portion of the cutter assembly, and FIG. 4 is an elevational view taken from the left hand side of FIG. 3.

DESCRIPTION OF THE PREFERRED EMBODIMENT

Figure 2:
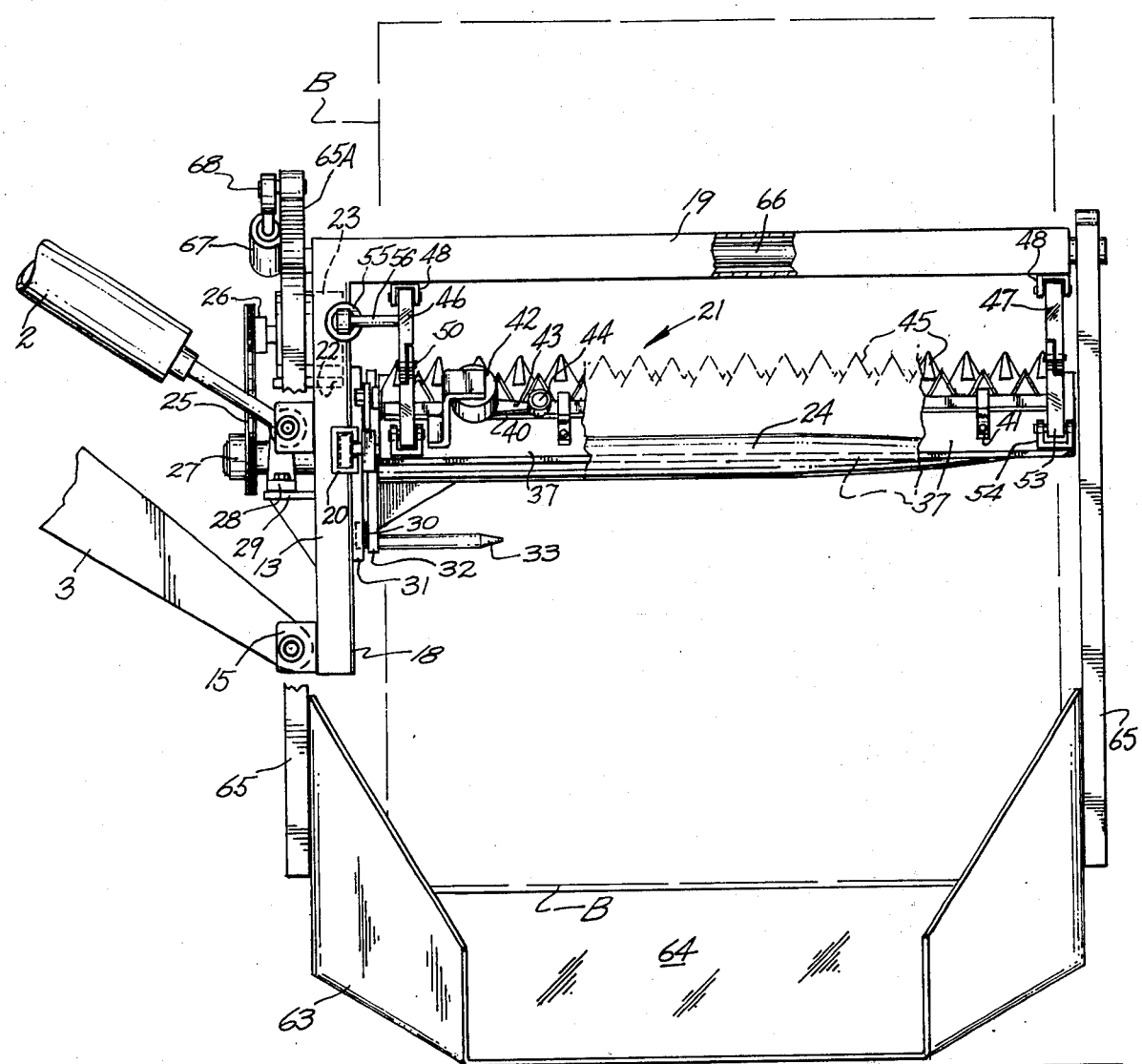
FIG. 2 is a side elevation of FIG. 1 taken from the left hand side thereof.

With continuing reference to the accompanying drawings wherein applied reference numerals indicate parts similarly identified in the following specification, the reference numeral 1 indicates a vehicle which may be of the type generally referred to as a front end loader or, alternatively, a farm tractor modified in the well known manner to incorporate a pair of lifting arms each conjointly operable with a hydraulic cylinder and linkage normally utilized in conjunction with a bucket attachment. Hydraulic cylinders at 2 operate in conjunction with lift arms 3 to impart both lifting movement to the conventionally utilized bucket (now dispensed with) as well as to impart tipping motion to said bucket. Wheels and an undercarriage of the vehicle are indicated at 4 and 5 respectively.

A frame of the present attachment is indicated at 10 and may be of welded beam construction having top and bottom members 11 and 12 and upright crossmembers 13 extending therebetween. The rear or vehicle side of said frame mounts a pair of laterally spaced plates 18. Upper and lower pairs of ears 14 and 15 are secured to the frame within which are pivotally connected the forward ends of hydraulic cylinders 2 and lift arms 3. A lateral frame extension at 11A is embodied in an extension of upper frame member 11 and serves to support a forwardly projecting frame member 19 which serves to mount later described components. Frame member 19 may be a box beam for rigidly supporting a pivoted chute as later described.

Indicated at 20 is a guideway of channel configuration secured at spaced apart points to a pair of upright frame crossmembers 13, said guideway serving to support one end of a movable cutter assembly indicated generally at 21 and hereinafter described in detail. A bale B is shown in phantom lines.

In place on and projecting rearwardly from frame 10, is a motor mounting plate 22 on which a hydraulic motor 23 is secured. The motor being in fluid circuit by flexible hydraulic lines (not shown) with a source of hydraulic pressure normally provided by an accessory driving pump associated with the vehicle. Suitable valve controls are provided the vehicle operator to enable regulation of the fluid flow to and hence the speed of motor 23.

A bale engaging spindle is indicated at 24 and powered by power transmission means shown as a roller chain 25 with driving and driven sprockets 26 and 27 associated therewith. Spindle supporting bearings at 28 of the pillow block type are mounted on a bearing plate 29 the latter welded to a frame 10. Additional spindle supporting means are provided on the front side of frame 10 such being embodied in roller bearings 30 journalled within a bearing plate 31 affixed to said frame. The back wall of spindle disc 32 and bearing plate 31 are in juxtaposition so that said disc is in rolling contact with plate mounted bearings 30 with spindle supported loads being imparted to bearings 30 and to earlier mentioned pillow block bearings 28.

Projecting forwardly from spindle disc 32 are gusset reinforced prongs 33 insertable, along with spindle 24, into the bale during bale pick up. Accordingly, impaled bales, which may weigh up to approximately 3,000 pounds, are rotatable about the axis of spindle 24 the latter being powered by motor 23 at a speed controlled by the vehicle operator. Additionally, the bale is positionable relative to the ground surface depending upon desired placement of the shredded hay. For example, the apparatus thus far described may be used simply for bale transport with the bale raised a distance sufficient to clear ground obstacles and with motor 23 being inoperative. The apparatus, so used, dispenses with the need for costly lifting fork attachments used heretofore for bale transport.

Earlier mentioned cutter assembly 21, is slidably supported at its inner end by means of guideway 20 on frame 10 with cutter assembly rollers 36 (FIGS. 3 and 4) entrained within said guideway. A cutter assembly base plate 35 mounts rollers 36 and additionally serves to mount the inner end of a cutter bar 37. A boss 38, formed on said cutter bar, is rotatably engaged about a pivot pin 39 carried by the cutter base plate to enable rotational movement of the cutter bar 37 about a horizontal axis. Slidably mounted on cutter bar 37 is a reciprocal, toothed knife 40 coextensive in length with said bar. A series of pointed guards 45 are suitably mounted on said cutter bar with the cutting action taking place between said knife and the guards. Keepers at 41, mounted on cutter bar 37, confine the knife for reciprocal movement imparted thereto by a hydraulic motor 42 driving a pitman 43 journalled at its outer end about a knife mounted pivot pin 44. The foregoing description of the cutter assembly, with the exception of the rollers and base plate, describes an assembly not unlike mower attachments for farm tractors wherein a reciprocating, toothed knife reciprocates above a cutter bar with the knife confined to reciprocal movement relative to a supporting, tooth equipped cutter bar.

For positioning the cutter assembly, I provide arm positioning means including arm linkages each comprising upper arms 46–47 each pivotally mounted at their upper ends to frame mounted clevises 48 on forwardly projecting frame member 19. Said upper arms are hingedly connected at 50–51 to lower arms 52–53 which, in turn, are pivotally attached at their lower ends via clevises 54 to cutter bar 37. Cutter assembly 21, and specifically base plate 35 thereof, is positioned along guideway 20 by a hydraulic cylinder 55, its piston rod 55A imparting movement to one of said upper arms via an arm 56. With reference to FIG. 1, retraction of the piston rod 55A will gradually advance cutter assembly 21 towards the broken line position shown advancing same inward toward the bale center during a bale dispensing operation. Such advancement will be in a gradual manner and is regulated by the operator in conjunction with the speed of bale rotation to achieve the desired results.

To enable inclination of the cutter assembly about a horizontal axis and hence the angle at which said assembly engages the bale B, I provide a quadrant shaped support 57 (FIG. 3) carried by base plate 35 by means of a gusset reinforced plate extension 58. An ear 60 located at the inner end of cutter bar 37 is apertured to receive a locking bolt assembly 61 also extending through, in an adjustable manner, the support 57.

To enable the vehicle operator to control placement of separated hay or fodder, a positionable delivery chute assembly includes a chute 63 somewhat wider, as viewed in FIG. 2, than the depth of the bale and having a downwardly inclined bottom wall 64 the discharge end of which is positionable from ground contact to a raised position, as for example, for material discharge into a feed trough. A pair of chute supporting arms 65 are swingably mounted to frame member 19 by means of a shaft 66 suitably journalled adjacent its ends within said frame member. Inparting swinging motion to arms 65 is a hydraulic cylinder 67, pin mounted at 69 to frame 10, the outer end of its piston rod 67A terminating in pivotal engagement at 68 with an inclined upward extension 65A of one of said arms. The pair of front end loader lift arms 3 along with arm cylinders 2 enable frame 10 to be retained in perpendicular relationship to a ground surface regardless of its elevation. Accordingly, the raising of frame 10 by the front end loader arms enables chute 63 to direct separated hay over feed bunk or trough walls during gradual forward movement of the vehicle for uniform distribution.

In operation, the bale is tipped on its side at a bale stacking site. Insertion of spindle 24 is made with the bale held in place by a barrier such as the remaining bales of the stack. Forward vehicle motion accomplishes spindle-bale engagement to the extent spindle disc 32 is located adjacent the center of the back side of the bale. The lift arms 3 of the vehicle are raised with frame 10 kept substantially parallel to the ground surface by retraction of the piston rods of hydraulic cylinders 2. The bale is at all times located medially of a vertical plane containing the vehicle centerline to avoid a tipping risk to the vehicle and operator. Depending on where the dispensed hay is to be discharged, frame 10 is elevated with chute 63 being positioned laterally of the bale. To commence dispersal of the hay (or other fodder) cutter assembly 21 is advanced by operator actuation of cylinder 55 with the speed of bale rotation also being operator controlled by suitable valve controls in circuit with hydraulic motor 22. With frame 10 elevated and chute 63 positioned outwardly from its FIG. 1 position, the hay may be discharged over a feed bunk wall several feet in height as the vehicle traverses one side of the feed bunk. The hay (fodder) dispersed is in a loose, chopped condition ideal for feeding purposes.

While I have shown but one embodiment of the invention it will be apparent to those skilled in the art that the invention may be embodied still otherwise without departing from the spirit and scope of the invention.

Having thus described the invention what is desired to be secured under a Letters Patent is:

1. An attachment for lifting and transporting circular bales of hay or the like and dispensing same, said attachment adapted for coupled engagement with the lift arms of a vehicle, said attachment comprising, a frame disposed transversely and forwardly of the vehicle and adapted for supported engagement with the vehicle lift arms, spindle means rotatably mounted on said frame and projecting forwardly therefrom for inserted engagement with a bale, means on said frame imparting rotation to said spindle, an elongate cutter assembly supported by said frame in offset parallel relationship to said spindle means, and means mounted on said frame urging said cutter assembly toward and away from the bale for dispensing the baled material.

2. The invention claimed in claim 1 wherein said frame additionally includes a guideway, said cutter assembly including means entrained for travel along said guideway.

3. The invention claimed in claim 2 additionally including a delivery chute, arm means swingably mounting said chute to said frame for movement of the chute laterally of the bale and spindle means.

4. The invention claimed in claim 1 wherein said frame additionally includes a forwardly extending frame member located at one side of the frame, arm linkages coupling said cutter assembly to said forwardly extending frame member, powered means mounted on said frame positioning said arm linkages and hence said cutter assembly along said guideway.

5. The invention claimed in claim 1 wherein said frame additionally includes an upright bearing plate having roller bearings mounted thereon and cooperating with said spindle means to bear operational spindle loads.

6. The invention claimed in claim 2 wherein said cutter assembly additionally includes a cutter bar and pivot means mounting one end of said cutter bar permitting adjusted movement of said bar about a horizontal axis permitting cutter bar angulation to be varied with respect to the bale.

7. The invention claimed in claim 1 wherein said frame additionally includes a guideway, said cutter assembly including a base plate, means carried by said base plate in entrained engagement with said guideway, a cutter bar, pivot means mounting said cutter bar to said base plate, and lockable support means additionally coupling said cutter bar to said base plate and operable to maintain the cutter bar in a desired angular relationship to the rotatable bale.

* * * * *